(12) United States Patent
Ward et al.

(10) Patent No.: US 11,068,274 B2
(45) Date of Patent: Jul. 20, 2021

(54) PRIORITIZED INSTRUCTIONS IN AN INSTRUCTION COMPLETION TABLE OF A SIMULTANEOUS MULTITHREADING PROCESSOR

(71) Applicant: International Business Machines Corporation, Armonk, NY (US)

(72) Inventors: Kenneth L. Ward, Austin, TX (US); Susan E. Eisen, Round Rock, TX (US); Dung Q. Nguyen, Austin, TX (US); Albert J. Van Norstrand, Jr., Round Rock, TX (US); Glenn O. Kincaid, Austin, TX (US); Christopher M. Mueller, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 15/843,982

(22) Filed: Dec. 15, 2017

(65) Prior Publication Data

US 2019/0187992 A1 Jun. 20, 2019

(51) Int. Cl.
*G06F 9/38* (2018.01)
*G06F 9/48* (2006.01)

(52) U.S. Cl.
CPC .......... *G06F 9/3851* (2013.01); *G06F 9/4818* (2013.01)

(58) Field of Classification Search
CPC ........... G06F 9/3851; G06F 9/00–3897; G06F 15/00–825
See application file for complete search history.

(56) References Cited

U.S. PATENT DOCUMENTS

| | | | | |
|---|---|---|---|---|
| 6,018,759 A | * | 1/2000 | Doing | G06F 9/3009 712/E9.032 |
| 6,049,867 A | * | 4/2000 | Eickemeyer | G06F 9/3851 711/122 |
| 6,073,159 A | * | 6/2000 | Emer | G06F 9/3851 712/E9.053 |
| 6,076,157 A | * | 6/2000 | Borkenhagen | G06F 9/3851 712/228 |
| 6,105,051 A | * | 8/2000 | Borkenhagen | G06F 9/3009 712/E9.032 |
| 6,212,544 B1 | * | 4/2001 | Borkenhagen | G06F 9/3009 712/E9.032 |
| 6,543,003 B1 | * | 4/2003 | Floyd | G06F 9/3861 712/219 |
| 6,567,839 B1 | * | 5/2003 | Borkenhagen | G06F 9/3009 712/205 |

(Continued)

OTHER PUBLICATIONS

B. Thompto, "POWER9: Processor for the cognitive era," 2016 IEEE Hot Chips 28 Symposium (HCS), Cupertino, CA, Aug. 21-23, 2016, pp. 1-19. (Year: 2016).*

*Primary Examiner* — Keith E Vicary
(74) *Attorney, Agent, or Firm* — Gero G. McClellan

(57) ABSTRACT

A simultaneous multithreading processor is configured to select a first thread of the plurality of threads according to a predefined scheme, and access an instruction completion table to determine whether the first thread is eligible to have a first instruction prioritized. Responsive to determining that the first thread is eligible to have the first instruction prioritized, the simultaneous multithreading processor is further configured to execute the first instruction of the first thread using a dedicated prioritization resource.

20 Claims, 4 Drawing Sheets

(56) References Cited

U.S. PATENT DOCUMENTS

| | | | | |
|---|---|---|---|---|
| 7,007,153 | B1* | 2/2006 | Berenbaum | G06F 9/3851 712/24 |
| 7,360,064 | B1* | 4/2008 | Steiss | G06F 9/3802 712/214 |
| 7,518,993 | B1* | 4/2009 | Dennis | G06F 9/30079 370/235 |
| 7,725,685 | B2 | 5/2010 | Floyd et al. | |
| 7,996,722 | B2 | 8/2011 | Burdick et al. | |
| 8,166,464 | B2 | 4/2012 | Lin et al. | |
| 9,069,564 | B1* | 6/2015 | Rashid | G06F 9/3802 |
| 2001/0056456 | A1* | 12/2001 | Cota-Robles | G06F 9/3851 718/103 |
| 2002/0062435 | A1* | 5/2002 | Nemirovsky | G06F 9/3851 712/7 |
| 2002/0199088 | A1* | 12/2002 | Burns | G06F 9/3851 712/228 |
| 2003/0233394 | A1* | 12/2003 | Rudd | G06F 9/3851 718/107 |
| 2004/0215945 | A1* | 10/2004 | Burky | G06F 9/30076 712/245 |
| 2004/0216106 | A1* | 10/2004 | Kalla | G06F 9/3851 718/100 |
| 2005/0021931 | A1* | 1/2005 | Anderson | G06F 9/3836 712/220 |
| 2005/0198475 | A1* | 9/2005 | Arnold | G06F 9/3851 712/228 |
| 2006/0174246 | A1* | 8/2006 | Tamura | G06F 9/4812 718/100 |
| 2006/0179280 | A1* | 8/2006 | Jensen | G06F 9/30087 712/214 |
| 2006/0179281 | A1* | 8/2006 | Jensen | G06F 9/3836 712/214 |
| 2006/0179289 | A1* | 8/2006 | Floyd | G06F 9/3012 712/227 |
| 2009/0138682 | A1* | 5/2009 | Capps, Jr. | G06F 9/30101 712/220 |
| 2009/0249349 | A1* | 10/2009 | Bose | G06F 9/4893 718/103 |
| 2010/0082945 | A1* | 4/2010 | Adachi | G06F 9/3851 712/200 |
| 2012/0254882 | A1* | 10/2012 | Makljenovic | G06F 9/5011 718/103 |
| 2014/0201505 | A1* | 7/2014 | Merten | G06F 9/3851 712/226 |

* cited by examiner

PRIORITIZED INSTRUCTIONS IN AN INSTRUCTION COMPLETION TABLE OF A SIMULTANEOUS MULTITHREADING PROCESSOR

BACKGROUND

Embodiments presented herein generally relate to issuing instructions in a processor, and more specifically, to prioritizing instructions for a simultaneous multithreading processor using an instruction completion table.

A conventional superscalar processor may issue instructions out-of-order with respect to a predefined program order. Because subsequent instructions are often dependent upon results of previous instructions, an issue queue in the processor may use a dependency tracking scheme to ensure that all data dependencies are followed. For instance, in one approach, the processor manages dependencies using instruction tags. At issue of an instruction in a given clock cycle to a given execution unit, the processor associates the instruction with an instruction tag that uniquely identifies the instruction within the processor. Further, during the same cycle, an execution unit may broadcast the instruction tag to the issue queue. Doing so may wake up one or more instructions that are dependent on the associated instruction (i.e., indicates that source operands for the dependent instructions are ready) and prepares the instructions for subsequent issue.

Simultaneous multithreading (SMT) allows various core resources of a processor to be shared by a plurality of instruction streams known as "threads." Core resources can include instruction-execution units, caches, translation-lookaside buffers (TLBs), and the like, which may be collectively referred to generally as a processor core (or "core"). In an SMT environment, the amount of core resources that is consumed by each thread can vary dynamically depending on the ordering of issued instructions, especially for implementations where the instructions are issued out-of-order respective to the program order. In some cases, a thread can hang when other threads are consuming large amounts of the core resources.

SUMMARY

According to one embodiment, a method is disclosed for operating a simultaneous multithreading processor configured to execute a plurality of threads. The method comprises selecting a first thread of the plurality of threads according to a predefined scheme, accessing an instruction completion table to determine whether the first thread is eligible to have a first instruction prioritized. The method further comprises, responsive to determining that the first thread is eligible to have the first instruction prioritized, executing the first instruction of the first thread using a dedicated prioritization resource.

According to another embodiment, a simultaneous multithreading processor is disclosed for executing a plurality of threads. The simultaneous multithreading processor is configured to select a first thread of the plurality of threads according to a predefined scheme, and access an instruction completion table to determine whether the first thread is eligible to have a first instruction prioritized. The simultaneous multithreading processor is further configured to, responsive to determining that the first thread is eligible to have the first instruction prioritized, execute the first instruction of the first thread using a dedicated prioritization resource.

According to yet another embodiment, a simultaneous multithreading processor is disclosed for executing a plurality of threads. The simultaneous multithreading processor comprises hang detection logic configured to transmit information identifying a hung thread of the plurality of threads. The hung thread includes at least a first instruction. The simultaneous multithreading processor further comprises update logic configured to update an instruction completion table using the transmitted information, wherein the instruction completion table as updated includes one or both of (i) the hung thread designated as a prioritized thread of the plurality of threads and (ii) the first instruction of the hung thread designated as a prioritized instruction of the first thread. The simultaneous multithreading processor further comprises an issue unit configured to prioritize the first instruction to be a next-issued instruction.

DETAILED DESCRIPTION

The descriptions of the various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
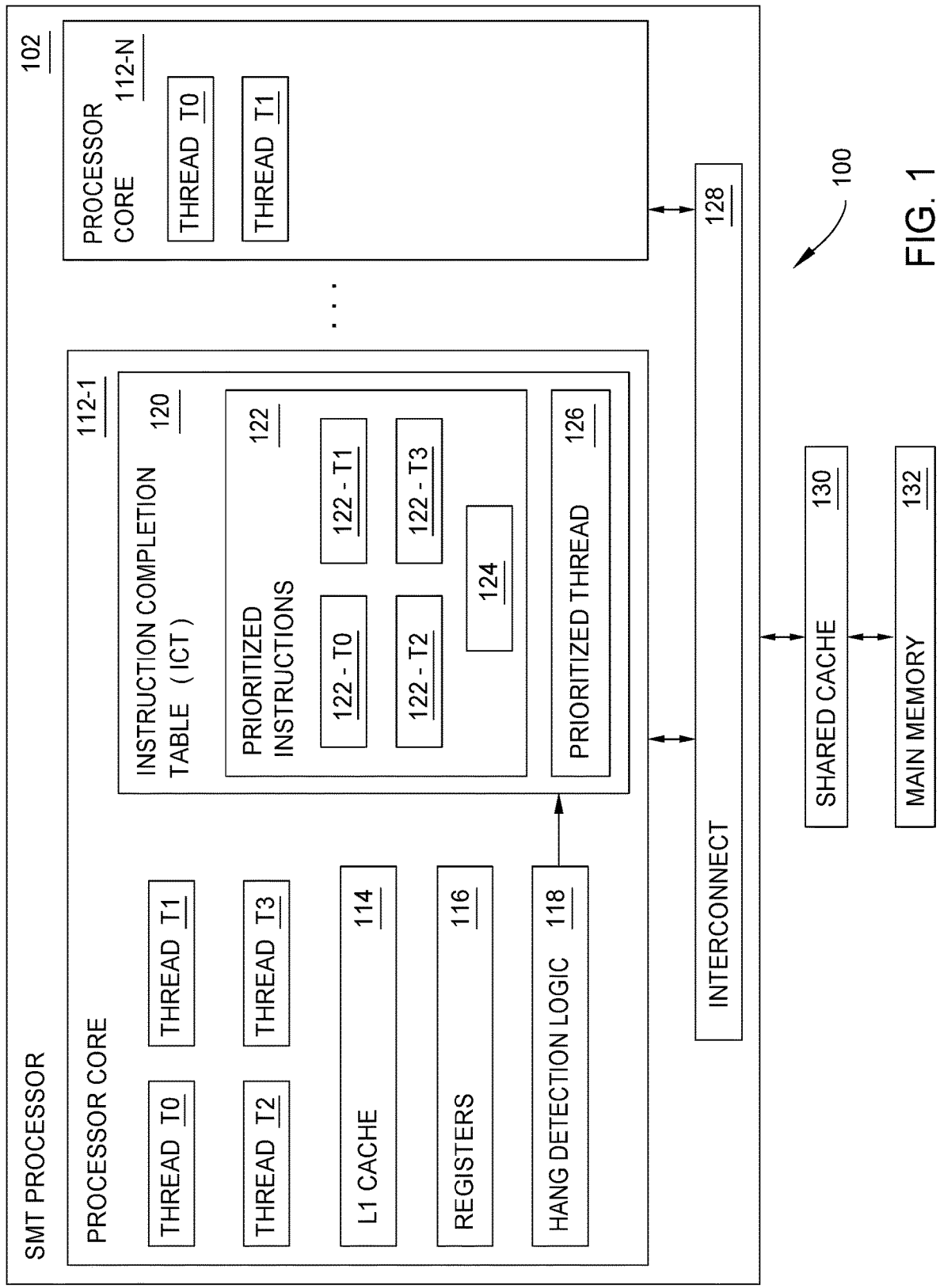
FIG. 1 illustrates an exemplary SMT multicore environment, according to embodiments described herein.

FIG. 1 illustrates an exemplary SMT multicore environment 100 according to an embodiment. The SMT multicore environment 100 can include multiple instances of an SMT processor 102 (or processor 102). As shown, a plurality of processor cores 112-1 to 112-N (generally referred to as processor cores 112) are included on one SMT processor die or SMT processor 102, and the plurality of processor cores 112-1 to 112 -N is interconnected with an interconnect 128 under management of an interconnect control (not shown). Each processor core 112 may have an instruction cache for caching instructions from memory to be executed and a data cache for caching data (operands) of memory locations to be operated on by the processor core 112. In one embodiment, caches of multiple SMT processors 102 may be interconnected to support cache coherency between the caches of the multiple SMT processors 102. The processor core 112 caches may include one level of caching in a hierarchical cache structure. For example, each SMT processor 102 may employ a shared cache 130 to be shared among all or a subset of the processor cores 112 on the SMT processor 102, where the shared cache 130 is arranged between the SMT processor 102 and a main memory 132. Additionally, each processor core 112 may have its own level 1 (L1) cache 114 directly on the processor core 112, where the L1 cache 114 is not shared among the different processor cores 112 but is a core-internal cache. Also, each processor core 112 may have one or more registers 116 for storing small amounts of data, status, and configuration information.

It is understood that the processor cores 112 may be physical devices that include all the circuitry (i.e., hardware and/or firmware) necessary to execute instructions as understood by one skilled in the art. Although the SMT processor 102 may include multiple processor cores 112, various examples may be provided with reference to processor core 112-1 for ease of understanding and not limitation. It is understood that further details shown and discussed relative to processor core 112-1 apply by analogy to all processor cores 112, and these details may be included in all of the processor cores 112.

The processor core 112-1 is shown with four threads T0, T1, T2, and T3, and each thread T0, T1, T2, and T3 includes a separate sequence of instructions or instruction stream, such as a program or a portion thereof. Each processor core 112-1 to 112-N may be configured to support different predefined levels of SMT, where a level corresponds to a particular number of threads. In the example of FIG. 1, the processor core 112-1 is configured to execute four threads T0, T1, T2, and T3 in parallel, while the processor core 112-N is configured to execute two threads T0 and T1 in parallel. While shown with four threads T0, T1, T2, and T3, other implementations of the processor core 112 may be configured in a single thread mode and/or a higher order mode with any suitable number of threads.

At an architecture level, each thread T0, T1, T2, and T3 may represent an independent central processing unit (CPU). Instructions which the thread T0, T1, T2, and T3 has for execution by the processor core 112 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units of each processor core 112 are accessed in parallel by executing one or more of the instructions in a thread T0, T1, T2, and T3 using a processing pipeline and through out-of-sequence execution as described with further reference to FIG. 2.

Figure 2:
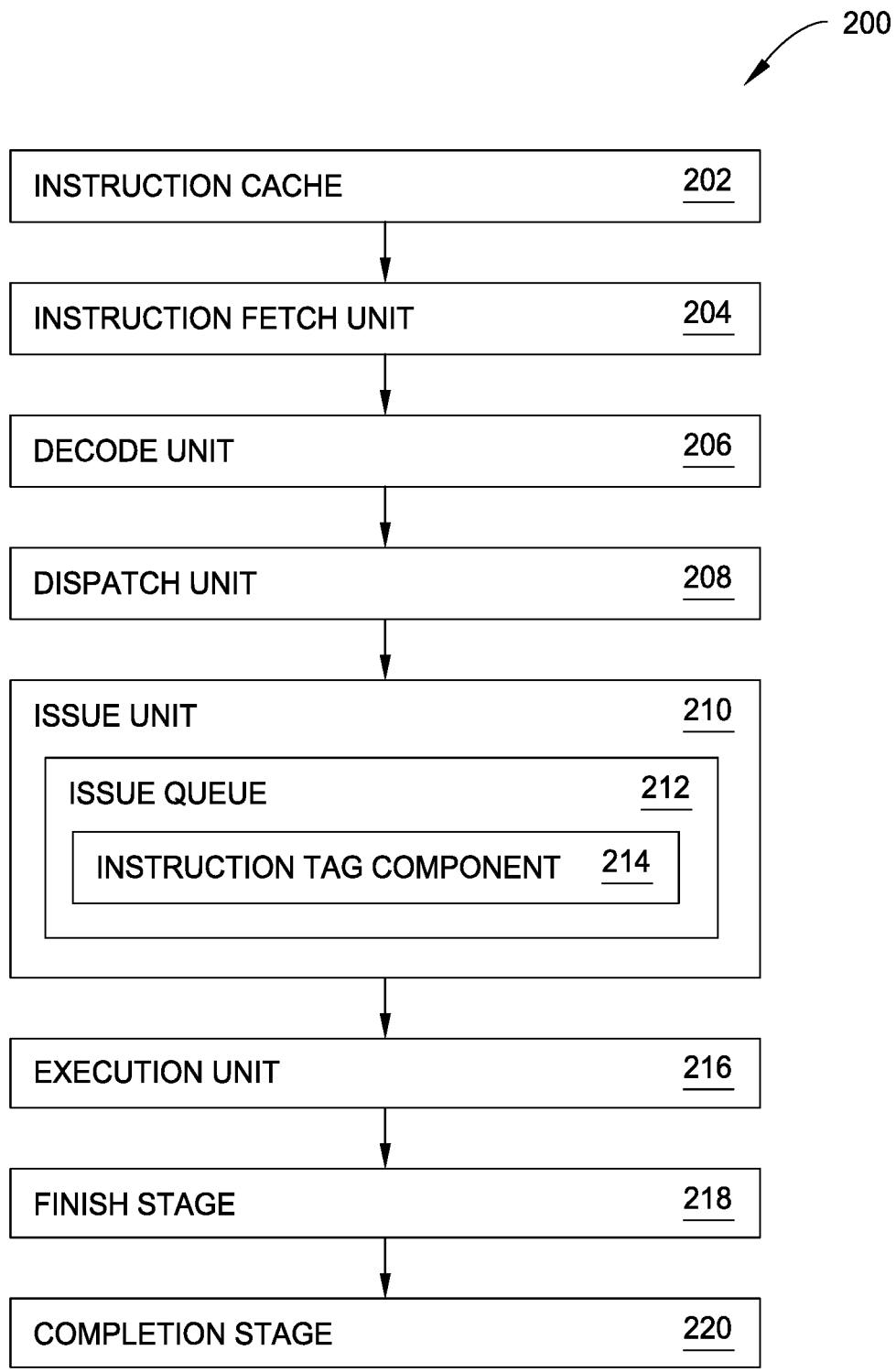
FIG. 2 illustrates a portion of an exemplary processing pipeline of a processor core, according to embodiments described herein.

FIG. 2 illustrates a portion of an exemplary processing pipeline 200 of a processor core, such as the processor core 112 illustrated in FIG. 1. An instruction cache 202 may hold a sequence of instructions for one or more of the threads of the processor core. An instruction fetch unit 204 may fetch instructions from the instruction cache 202 and provide the fetched instructions to a decode unit 206. The decode unit 206 can decode the instructions and form groups of instructions to be dispatched by a dispatch unit 208. The groups of instructions may be tracked in a predefined storage structure, such as an instruction completion table (ICT) 120, as further described herein. The processing pipeline 200 may include out-of-order processing that can be performed on groups of instructions, such as issuing the instructions out-of-order using an issue unit 210. The issue unit 210 analyzes the instructions or other data and transmits the decoded instructions, portions of instructions, or other data to an execution unit 216 in an execution stage based on the analysis. The execution unit 216 executes the instructions. While illustrated as a single execution unit 216, the execution unit 216 may be representative of a plurality of execution units 216, such as one or more fixed-point execution units, one or more floating-point execution units, one or more load/store execution units, and/or one or more vector execution units.

As shown, the issue unit 210 includes an issue queue 212 that includes an instruction data store that stores issue queue instructions. For example, an issue queue that stores twenty-four instructions uses an instruction data store with twenty-four storage locations. The issue queue 212 may include an age array that tracks relative age data for each instruction within the instruction data store. The issue queue 212 may also include instruction select logic that determines which of the stored instructions to issue at a given clock cycle. For example, the instruction selection logic may prioritize older instructions that have been previously rejected (e.g., due to collisions with other issuing instructions) to issue over younger instructions in the issue queue 212.

In one embodiment, the issue queue 212 includes an instruction tag component 214. At issue of a given instruction during a clock cycle, the instruction tag component 214 associates an instruction tag with that instruction. The instruction tag uniquely identifies the instruction within the SMT processor 102. The execution unit 216 may broadcast the instruction tag to other consuming facilities of the SMT processor 102. For example, the execution unit 216 may broadcast the instruction tag to instructions that are stored in the issue queue 212. In turn, the instruction tag may be analyzed to determine any dependencies of the corresponding instruction to the instructions included in the issue queue 212. If an instruction of the issue queue 212 is dependent on the instruction corresponding to the instruction tag, the instruction "wakes up" for potential subsequent issue. As another example, the execution unit 216 may broadcast the instruction tag to a completion logic of the SMT processor 102 to indicate that the underlying instruction has finished execution.

As clock cycle latency can vary between instructions that are stored in the issue queue 212, and because multiple execution units 216 may broadcast instruction tags during each clock cycle, managing instruction tags presents several challenges (e.g., in minimizing power consumption, silicon usage, etc.). To address these challenges, in one embodiment, the processor core 112 may include a latency pipe that manages the instruction tags of issued instructions. The latency pipe is discussed further with respect to FIG. 3.

Within the processing pipeline 200, a finish stage 218 can track finishing execution of individual instructions of the groups of instructions. Once all instructions in a group of instructions finishes execution, the group of instructions completes in program order such that older groups in a sequence of instructions complete before a younger group of instructions, as managed by completion stage 220. Upon completion, the completion stage 220 can provide results and instruction information for checkpointing at a checkpoint stage (not shown), as well as release group management resources for reuse. The completion stage 220 can store information to establish a recovery state, such as a next instruction address to execute and various register status values after completion.

The processing pipeline 200 may include other features, such as error checking and handling logic and/or other features known in the art. In one embodiment, the processing pipeline 200 further comprises write-back logic configured to write results of instruction execution back to a destination resource. The destination resource may be any type of resource, including registers, cache memory, other memory, I/O circuitry to communicate with other devices, other processing circuits, or any other type of destination for executed instructions or data. In one embodiment, the processing pipeline includes one or more parallel paths, which may enable multiple threads or multiple instruction groups of a same thread to be executed simultaneously. While a forward path through the processing pipeline 200 is illustrated in FIG. 2, other feedback and signaling paths may be included between elements of the processing pipeline 200.

Returning to FIG. 1, the processor core 112 further comprises hang detection logic 118 that is configured to determine whether any of the threads T0, T1, T2, and T3 are hung (stated another way, a forward progress of the thread has stalled). The hang detection logic 118 is further configured to transmit information identifying a hung thread to update logic (not shown) configured to update the ICT 120. The hang detection logic 118 may have any suitable implementation, such as a timer configured to determine whether an instruction of the thread T0, T1, T2, T3 has been completed or flushed within a predefined amount of time. For example, a timer of the hang detection logic 118 may be programmable to correspond to a desired number of cycles of the processor core 112, and the timer may be reset upon completion or flush of a previous instruction. The update logic may have any suitable implementation, and may be included in the ICT 120 or separate.

The ICT 120 is generally configured to track the progress of all instructions in the processor core 112 even while being processed out-of-order (e.g., in a SMT multicore environment 100). For example, the ICT 120 may track the progress of instructions after being dispatched until the instruction is completed (or flushed). In some embodiments, each entry of the ICT 120 corresponds to a respective instruction in a 1:1 ratio, but this is not a requirement. The ICT 120 may include any suitable number of entries for tracking in-progress (or "in flight") instructions, such as 64 entries, 128 entries, 256 entries, 512 entries, or more. The ICT 120 may be organized by the physical threads T0, T1, T2, T3, such that any logical mapping is performed elsewhere in the processor core 112.

In some embodiments, the entries of the ICT 120 are allocated based on the number of threads being executed in parallel. Using an example of a 128-entry ICT 120, when operating in a single thread mode the ICT 120 includes 128 entries available for 128 instructions of the single thread. Assuming that the entries are allocated evenly between threads, when executing two threads in parallel, 64 entries may be allocated to each thread. When executing four threads in parallel, 32 entries may be allocated to each thread. Other simultaneous multithreading modes and different numbers of entries for different threads are also possible. In some embodiments, the number of entries allocated to each thread is determined dynamically. For example, a first thread that is used more often than a second thread may be allocated a greater number of entries.

In some embodiments, each instruction included in the ICT 120 is assigned a unique instruction tag (or "ITAG"), and the ICT 120 is indexed by the instruction tags. Each entry in the ICT 120 may include finish status information for the associated instruction, indicating when the instruction is ready for completion. While not discussed in detail here, the ICT 120 may include additional information such as information used to complete and/or flush instructions, exception trouble code information, and so forth.

In some embodiments, the ICT 120 includes a plurality of prioritized instructions 122 that correspond to the different threads T0, T1, T2, T3. As shown, prioritized instruction 122-T0 corresponds to an instruction selected from the thread T0, prioritized instruction 122-T1 corresponds to an instruction selected from the thread T1, and so forth. In one embodiment, each of the prioritized instructions 122-T0, 122-T1, 122-T2, 122-T3 is determined as the oldest instruction for the corresponding thread T0, T1, T2, T3. In other embodiments, one or more of the prioritized instructions 122-T0, 122-T1, 122-T2, 122-T3 is so designated responsive to determining that the corresponding thread T0, T1, T2, T3 is hung (e.g., receiving a signal from the hang detection logic 118).

In some embodiments, the ICT 120 maintains a tail pointer for each thread T0, T1, T2, T3 to identify the oldest instruction of the thread. The tail pointers corresponding to the different threads T0, T1, T2, T3 may be broadcast to different consuming facilities of the processor core 112, such as the branch unit, the issue queue, the load/store unit, etc. A prioritized instruction 122 from one of the threads T0, T1, T2, T3 may then be selected according to a predefined scheme. For example, when the hang detection logic 118 indicates that none of the threads T0, T1, T2, T3 are hung, the prioritized instruction 122 may be selected round-robin from eligible threads (i.e., having a valid instruction in progress). The ICT 120 may update the tail pointer(s) following completion of one of the oldest instructions. In this way, the prioritized instructions 122 for the different threads T0, T1, T2, T3 may be accessed using the tail pointers.

In one embodiment, a prioritized instruction 124 is selected from the different prioritized instructions 122-T0, 122-T1, 122-T2, 122-T3, such as the oldest instruction between the different prioritized instructions 122-T0, 122-T1, 122-T2, 122-T3. As shown, the ICT 120 may include information indicating that a particular thread of the different threads T0, T1, T2, T3 is designated as a prioritized thread 126. In one embodiment, the prioritized instruction 124 is selected from the prioritized thread 126.

In some embodiments, a dedicated prioritization resource is included in the processor core 112 for executing one or more of the prioritized instructions 122 and/or instructions from the prioritized thread 126. The processor core 112 may include one or more execution units that are dedicated to executing the prioritized instructions 122 and/or instructions from the prioritized thread 126. For example, the processor core 112 may include one or more dedicated arithmetic logic units (ALUs), floating-point units (FPUs), and/or load-store units (LSUs). In other embodiments, the execution unit(s) of the processor core 112 include additional slots that are dedicated to executing the prioritized instructions 122 and/or instructions from the prioritized thread 126.

Thus, according to one exemplary embodiment, each thread T0, T1, T2, T3 may include a hang detection counter (in hang detection logic 118) configured to detect when the corresponding thread T0, T1, T2, T3 is hung and not making any forward progress. When the thread T0, T1, T2, T3 is hung, the hang detection counter will signal the ICT 120 that the thread T0, T1, T2, T3 should be given a prioritized status (as prioritized thread 126). The prioritized status enables an execution unit of the processor core 112 to give priority to executing instructions of the prioritized thread 126.

When the hang detection logic 118 identifies the prioritized thread 126, the ICT 120 may broadcast the identity of the prioritized thread 126 and/or instruction tag(s) of prioritized instructions 122 to the various resource pools in the processor core 112. At the issue queue of the processor core 112, the issue queue may compare the received instruction tag with those already included in the issue queue. Those instructions matching the instruction tag may be given a highest priority to issue next. In one embodiment, instructions of the prioritized thread 126 are given higher issue priority without being specifically designated as prioritized instructions 122.

In any event, in some embodiments, the processor core 112 holds the instruction specified by the broadcasted instruction tag until the instruction is either completed or flushed. During this time, the prioritization resource is dedicated to performing the instruction. Following completion or flushing of the instruction, the processor core 112 may then proceed to the next thread T0, T1, T2, T3 according to the predefined scheme.

In some embodiments, the prioritized thread 126 and/or instruction tag(s) of prioritized instructions 122 are communicated to the ICT 120 to initiate next-to-complete plus one (NTC+1) flush of the prioritized thread 126. The NTC+1 flush operates to flush all instructions except the oldest instruction from the prioritized thread 126, which frees resources (such as issue bandwidth) for use with the prioritized instructions 122. The prioritized thread 126 may also be used by the ICT 120 to flush other threads of the threads T0, T1, T2, T3 to free resources for use with the prioritized thread 126.

In some embodiments, when multiple threads of the threads T0, T1, T2, T3 are hung at the same time, the processor core 112 may select one of the hung threads as the prioritized thread 126 according to a predetermined scheme. In one non-limiting example, the processor core 112 selects the prioritized thread 126 according to a round-robin scheme. Described another way, the processor core 112 cycles through a predefined order of the threads T0, T1, T2, T3. In this way, each hung thread may have an opportunity to be prioritized as the prioritized thread 126 and permitted to progress.

In some embodiments, selecting the prioritized thread 126 according to a predetermined scheme comprises determining whether a particular thread T0, T1, T2, T3 is eligible to have an instruction prioritized. For example, for thread T2 to be considered eligible, at least one instruction for thread T2 must have been dispatched (e.g., as reflected in the ICT 120). Assuming that the processor core 112 cycles through the threads in the order T0-T1-T2-T3 according to the predetermined scheme, the processor core 112 may cycle to thread T3 without prioritizing an instruction of thread T2, responsive to determining that thread T2 is ineligible at a particular time. At another time, assuming that thread T2 is determined to be eligible, the processor core 112 may cycle from thread T1 to thread T2 to thread T3.

Figure 3:
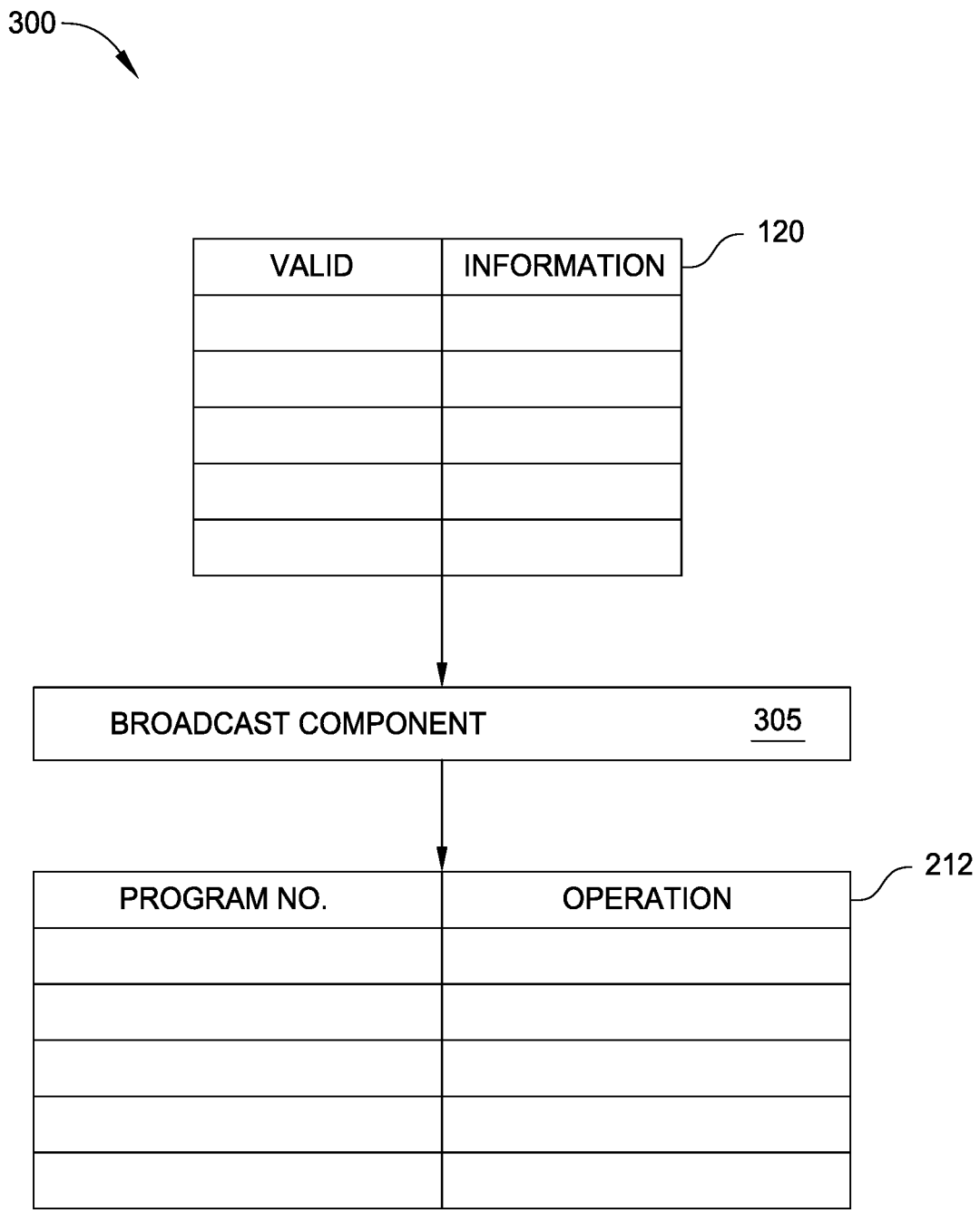
FIG. 3 illustrates a flow diagram of an exemplary interaction between an issue queue and an instruction completion table in a processor, according to embodiments described herein.

FIG. 3 illustrates a flow diagram 300 of an exemplary interaction between an issue queue 212 and the ICT 120 in a processor, according to embodiments described herein. Illustratively, the issue queue 212 stores instructions for issue. Each stored instruction in the issue queue 212 may include information such as program number, clock cycle latency, operations, a valid bit field, register pointers, end-of-operation bits, and so forth. In some cases, the issue queue 212 may have a fixed size.

The ICT 120 may include instruction tags associated with instructions that are to be issued from the issue queue 212. Each stored instruction tag may include a valid bit for the instruction and any other suitable information. Some non-limiting examples of suitable information include thread information, instruction type information (e.g., whether a store instruction, load instruction, etc.), whether the instruction is atomic, whether the instruction should stop responsive to an exception, a unique instruction tag identifier, and so forth. The entries of ICT 120 may be provided in order of dispatch, and completion of the instructions may be typically performed according to the dispatch order.

As mentioned above, the ICT 120 may broadcast the identity of a prioritized thread and/or instruction tag(s) of prioritized instructions using a broadcast component 305, such as a broadcast multiplexer or bus. In one embodiment, the broadcast component 305 broadcasts the instruction tag to a variety of consuming facilities, such as the issue queue 212, as depicted. As stated, the broadcast component 305 may also broadcast the instruction tag to other units of the processor 102, such as the branch unit, the issue queue, the load/store unit, and so forth.

Figure 4:
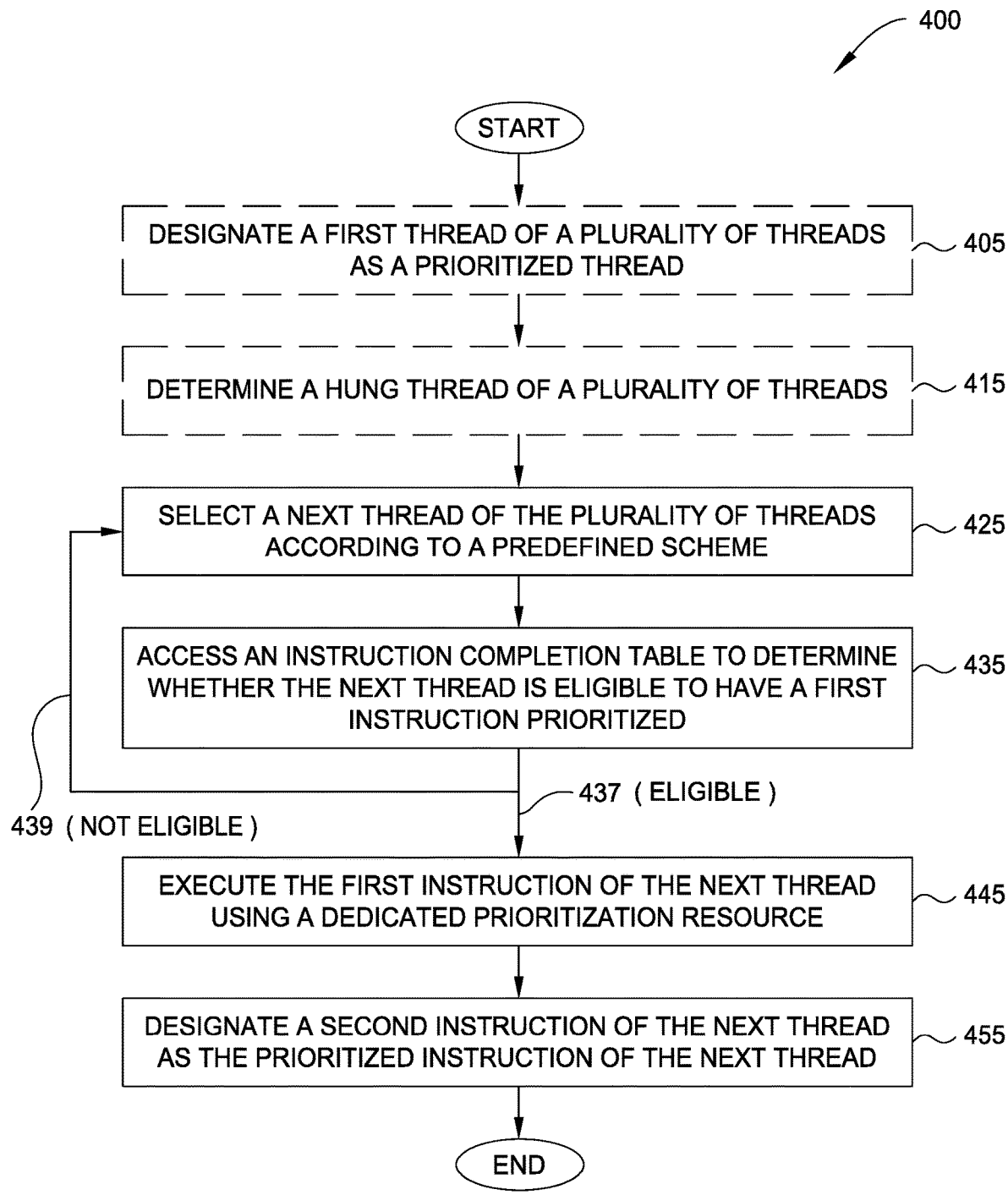
FIG. 4 is an exemplary method of operating a simultaneous multithreading processor configured to execute a plurality of threads, according to embodiments described herein.

FIG. 4 is an exemplary method 400 of operating a simultaneous multithreading processor configured to execute a plurality of threads, according to embodiments described herein. Method 400 may be used in conjunction with other embodiments disclosed herein, such as the processor 102 of FIG. 1.

Method 400 begins at block 405, where the processor 102 designates a first thread of a plurality of threads as a prioritized thread. At block 415, the processor 102 determines a hung thread of a plurality of threads. At block 425, the processor 102 selects a next thread of the plurality of threads according to a predefined scheme. In some embodiments, selection may be performed according to a round-robin scheme.

At block 435, the processor accesses an instruction completion table to determine whether the next thread is eligible to have a first instruction prioritized. In some embodiments, the next thread is considered eligible when one or more instructions of the thread have been dispatched. If the next thread is not eligible, the selection is not considered finalized, and the method 400 proceeds along path 439 to block 425 to select a next thread. If the next thread is eligible, the selection is considered finalized, and the method 400 proceeds along path 437 to block 445.

At block 445, the processor 102 executes the first instruction of the next thread using a dedicated prioritization resource. At block 455, the processor 102 designates a second instruction of the next thread as the prioritized instruction of the next thread. In some embodiments, designating the second instruction occurs after completing or flushing the first instruction. Method 400 ends following completion of block 455.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of operating a simultaneous multithreading processor (SMP) configured to execute a plurality of threads, the method comprising:
   executing, using a dedicated prioritization resource of the SMP dedicated to executing instructions included in a prioritized thread, instructions included in a first thread of the plurality of threads that is designated as the prioritized thread;
   updating an instruction completion table based on information from hang detection logic of the SMP, wherein the hang detection logic is configured to identify one or more hung threads of the plurality of threads by determining, based on a respective timer for each of the plurality of threads, whether a respective instruction of the respective thread has, within a given number of processor cycles, neither been completed nor flushed, wherein the respective timer is respectively reset upon each of completion and flush of a previous instruction of the respective thread, the information identifying the one or more hung threads;
   selecting a second thread of the plurality of threads according to a predefined scheme that cycles through the plurality of threads in a predefined order;
   determining, using the instruction completion table, whether any instructions of the second thread have been dispatched;
   upon determining that no instructions of the second thread have been dispatched, determining that the second thread is ineligible to have an instruction prioritized;
   selecting a third thread of the plurality of threads according to the predefined scheme;
   accessing the instruction completion table to determine whether the third thread is eligible to have a first instruction of the third thread prioritized;
   responsive to determining that the third thread is eligible, designating the third thread as the prioritized thread;
   performing a next-to-complete plus one (NTC+1) flush of the third thread; and
   executing the first instruction of the third thread using the dedicated prioritization resource.

2. The method of claim 1, wherein the first instruction is designated as a prioritized instruction of the third thread in the instruction completion table, the method further comprising:
   designating, after executing the first instruction, a second instruction of the third thread as the prioritized instruction of the third thread.

3. The method of claim 2, wherein the first instruction is an oldest instruction of the third thread, and wherein the second instruction is a next-oldest instruction of the third thread.

4. The method of claim 1, further comprising:
   dynamically allocating, to each of the plurality of threads, a respective number of entries of a plurality of entries in the instruction completion table such that a greater measure of thread use results in a greater number of entries being allocated.

5. The method of claim 1, wherein the SMP includes a first processor core comprising a processing pipeline that includes an instruction cache, an instruction fetch unit, a decode unit, a dispatch unit, an issue unit, an execution unit, a finish stage, a completion stage, and a checkpoint stage, wherein the issue unit includes an issue queue.

6. A simultaneous multithreading processor for executing a plurality of threads, the simultaneous multithreading processor comprising:
   a plurality of processor cores comprising a first processor core, the first processor core comprising hardware configured to:
      execute, using a dedicated prioritization resource of the first processor core that is dedicated to executing instructions included in a prioritized thread, instructions included in a first thread of the plurality of threads that is designated as the prioritized thread;
      update an instruction completion table based on information from hang detection logic of the SMP, wherein the hang detection logic is configured to identify one or more hung threads of the plurality of threads by determining, based on a respective timer for each of the plurality of threads, whether a respective instruction of the respective thread has, within a given number of processor cycles, neither been completed nor flushed, wherein the respective timer is respectively reset upon each of completion and flush of a previous instruction of the respective thread, the information identifying the one or more hung threads;
      select a second thread of the plurality of threads according to a predefined scheme that cycles through the plurality of threads in a predefined order;
      determine, using the instruction completion table, whether any instructions of the second thread have been dispatched;
      upon determining that no instructions of the second thread have been dispatched, determine that the second thread is ineligible to have an instruction prioritized;
      select a third thread of the plurality of threads according to the predefined scheme;
      access the instruction completion table of the first processor core to determine whether the third thread is eligible to have a first instruction of the third thread prioritized;
      responsive to determining that the third thread is eligible, designate the third thread as the prioritized thread;
      perform a next-to-complete plus one (NTC+1) flush of the third thread; and
      execute the first instruction of the third thread using the dedicated prioritization resource.

7. The simultaneous multithreading processor of claim 6, wherein the first instruction is designated as a prioritized instruction of the third thread in the instruction completion table, wherein the first processor core is further configured to:
   designate, after executing the first instruction, a second instruction of the third thread as the prioritized instruction of the third thread.

8. The simultaneous multithreading processor of claim 7, wherein the first instruction is an oldest instruction of the third thread, and wherein the second instruction is a next-oldest instruction of the third thread.

9. The simultaneous multithreading processor of claim 6, wherein the hardware is further configured to:
dynamically allocate, to each of the plurality of threads, a respective number of entries of a plurality of entries in the instruction completion table such that a greater measure of thread use results in a greater number of entries being allocated.

10. The simultaneous multithreading processor of claim 6, wherein the first processor core comprises a processing pipeline that includes an instruction cache, an instruction fetch unit, a decode unit, a dispatch unit, an issue unit, an execution unit, a finish stage, a completion stage, and a checkpoint stage, wherein the issue unit includes an issue queue.

11. A simultaneous multithreading processor for executing a plurality of threads, the simultaneous multithreading processor comprising:
a plurality of processor cores comprising a first processor core, the first processor core comprising:
execution unit hardware dedicated to executing instructions included in a prioritized thread designated from the plurality of threads;
hang detection logic hardware configured to transmit information identifying one or more hung threads of the plurality of threads, wherein each of the hung threads includes at least a respective instruction, wherein the hang detection logic hardware is configured to identify the one or more hung threads by determining, based on a respective timer for each of the plurality of threads, whether a respective instruction of the respective thread has, within a given number of processor cycles, neither been completed nor flushed, wherein the respective timer is respectively reset upon each of completion and flush of a previous instruction of the respective thread;
update logic hardware configured to update an instruction completion table using the transmitted information from the hang detection logic hardware, wherein the first processor core is configured to:
select a next thread of the plurality of threads according to a predefined scheme that cycles through the plurality of threads in a predefined order;
determine, using the instruction completion table as updated, whether any instructions of the next thread have been dispatched;
determine, based on whether any instructions of the next thread have been dispatched, whether the next thread is eligible to have an instruction prioritized;
responsive to determining that the next thread is eligible, designate the next thread as the prioritized thread; and
perform a next-to-complete plus one (NTC+1) flush of the next thread; and
issue unit hardware configured to prioritize a first instruction of the prioritized thread to be a next-issued instruction.

12. The simultaneous multithreading processor of claim 11, wherein the first instruction is designated as a prioritized instruction of a hung thread of the one or more hung threads in the instruction completion table, and wherein the first processor core is further configured to designate, after the execution unit hardware executes the first instruction, a second instruction of the hung thread as the prioritized instruction of the hung thread.

13. The simultaneous multithreading processor of claim 12, wherein the first instruction is an oldest instruction of the hung thread, and wherein the second instruction is a next-oldest instruction of the hung thread.

14. The simultaneous multithreading processor of claim 11, wherein the first processor core is further configured to:
dynamically allocate, to each of the plurality of threads, a respective number of entries of a plurality of entries in the instruction completion table such that a greater measure of thread use results in a greater number of entries being allocated.

15. The simultaneous multithreading processor of claim 14, wherein the first processor core comprises a processing pipeline that includes an instruction cache, an instruction fetch unit, a decode unit, a dispatch unit, the issue unit hardware, the execution unit hardware, a finish stage, a completion stage, and a checkpoint stage, wherein the issue unit hardware includes an issue queue.

16. The simultaneous multithreading processor of claim 15, wherein the issue queue includes an instruction tag component, wherein the instruction tag component is configured to associate each issued instruction with a respective instruction tag, wherein the execution unit hardware is configured to broadcast, to the issue queue, an identity of each prioritized thread and an instruction tag of each prioritized instruction.

17. The simultaneous multithreading processor of claim 16, wherein each entry in the instruction completion table includes finish status information, instruction completion information, instruction flush information, and exception trouble code information.

18. The simultaneous multithreading processor of claim 17, wherein each instruction tag includes a valid bit, thread information, instruction-type information, instruction atomicity information, exception stop information, and tag identifier information.

19. The simultaneous multithreading processor of claim 18, wherein the first instruction is designated as a prioritized instruction of a hung thread of the one or more hung threads in the instruction completion table, wherein the first processor core is further configured to designate, after the execution unit hardware executes the first instruction, a second instruction of the hung thread as the prioritized instruction of the hung thread.

20. The simultaneous multithreading processor of claim 19, wherein the first instruction is an oldest instruction of the hung thread, wherein the second instruction is a next-oldest instruction of the hung thread, wherein the predefined scheme comprises a round-robin scheme.

* * * * *